United States Patent
Tsutsui et al.

[19]

[11] Patent Number: 5,902,213
[45] Date of Patent: May 11, 1999

[54] SHIFT CONTROL DEVICE FOR AUTOMATIC TRANSMISSION

[75] Inventors: Hiroshi Tsutsui; Masaaki Nishida; Yoshihisa Yamamoto; Akitomo Suzuki, all of Anjo, Japan

[73] Assignee: Aisin AW Co., Ltd., Anjo, Japan

[21] Appl. No.: 08/995,518

[22] Filed: Dec. 22, 1997

[30] Foreign Application Priority Data

Jan. 30, 1997 [JP] Japan ................................. 9-017227

[51] Int. Cl.⁶ .................................................. F16H 61/08
[52] U.S. Cl. .......................... 477/155; 475/126; 475/292; 477/130
[58] Field of Search ................................ 475/125, 126, 475/283, 289, 292; 477/118, 130, 143, 154, 155

[56] References Cited

U.S. PATENT DOCUMENTS 4,485,695 12/1984 Kawamoto .............................. 477/130
4,881,429 11/1989 Kobayashi et al. .................. 477/155 X
5,505,673 4/1996 Tsukamoto et al. ................. 477/143 X

FOREIGN PATENT DOCUMENTS

A-63-219949 9/1988 Japan .

*Primary Examiner*—Charles A. Marmor
*Assistant Examiner*—Sherry Lynn Estremsky
*Attorney, Agent, or Firm*—Oliff & Berridge, PLC

[57] ABSTRACT

In an automatic transmission including a gear unit with a second brake connected in series with a one-way clutch and a first brake that is not connected with a one-way clutch, the second brake and the first brake are controlled by linear solenoid valves individually. A vehicle load is detected, and when the vehicle is in a high load state, at first the second brake performs an engagement control, then after input rotation to the gear unit is synchronized with output rotation of the gear unit, the first brake performs an engagement control. When the vehicle is in a low load state, at first the first brake performs an engagement control, then after input rotation to the gear unit is synchronized with output rotation of the gear unit, the second brake performs an engagement control.

10 Claims, 10 Drawing Sheets

| | C1 | C2 | C3 | B1 | B2 | B3 | B4 | B5 | F1 | F2 |
|---|---|---|---|---|---|---|---|---|---|---|
| N | | | | | | | | ○ | | |
| 1ST | ○ | | | | | ◌ | | ○ | | ○ |
| 2ND | ○ | | | □ | ○ | | | ○ | ○ | |
| 3RD | ○ | | | ○ | ○ | | ○ | | ○ | |
| 4TH | ○ | | ○ | ○ | ○ | | | | ○ | |
| 5TH | ○ | ○ | ○ | | ○ | | | | | |
| 3Low | ○ | ○ | | | ○ | | | ○ | | |
| 4Low | ○ | ○ | | | ○ | | ○ | | | |
| REV | | ○ | | | | ○ | | ○ | | |

◌ : Engine Brake      □ : Operated with Necessity

SHIFT CONTROL DEVICE FOR AUTOMATIC TRANSMISSION

BACKGROUND OF THE INVENTION

1. Field of the Invention

The invention relates to an automatic transmission mounted on a vehicle. More specifically, it relates to a shift control device for the automatic transmission having a frictional engagement element connected via a one-way clutch and a frictional engagement element for a coasting state.

2. Description of the Prior Art

In general, an automatic transmission has a frictional engagement element connected with a one-way clutch in series. When the frictional engagement element is released and the automatic transmission performs a down shift, the one-way clutch is synchronistically engaged automatically. During a coasting state, power can not be transmitted from the wheels to the engine because of interposition of the one-way clutch. Therefore, the automatic transmission also has a frictional engagement element which is not connected with a one-way clutch during the coasting state in order to enable engine braking. The frictional engagement element that is not connected in series with a one-way clutch is arranged in parallel with the frictional engagement element connected in series with a one-way clutch.

Figure 10A:
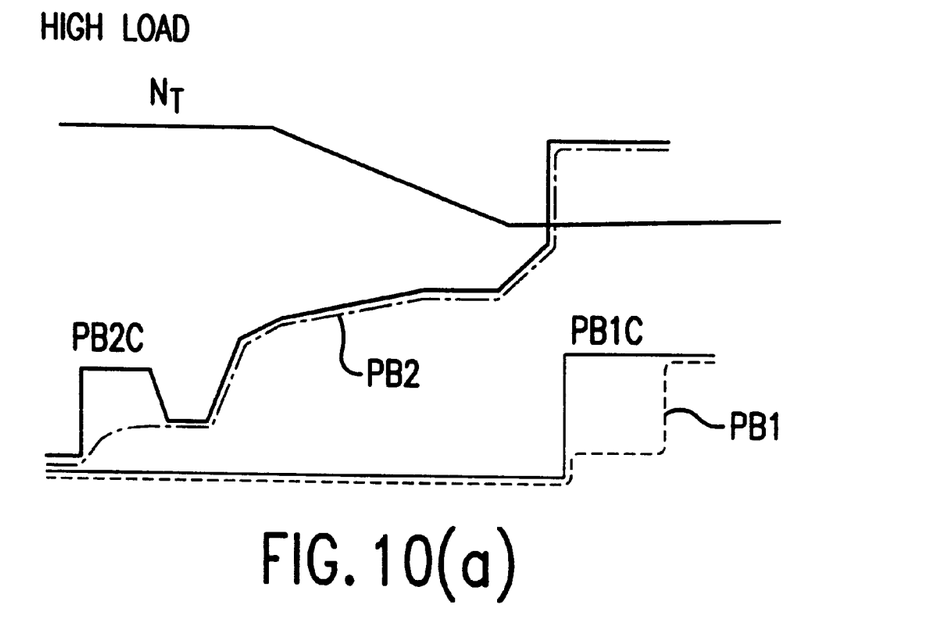
FIG. 10(a)–10(b) is a timing chart of the prior art applied to the invention.

A conventional shift control device having the aforementioned two frictional engagement elements in parallel with each other is disclosed in Japanese published patent application laid-open No. 219949/88. FIG. 10(a) indicates the control of that device applied to the embodiment of the invention. A second frictional engagement element connected in series with a one-way clutch is made to be B2. A first frictional engagement element for a coasting state is made to be B1. Hydraulic pressures of the hydraulic servos for B2 and BI are made to be PB2 and PB1 individually, and adjusting signals for PB2 and PB1 are made to be PB2C and PB1C individually. After piston stroke control in the hydraulic servos is performed to bring the functional engagement element to a state just before a torque is transmitted, the hydraulic pressure PB2 for the hydraulic servo connected to the second frictional engagement element B2 is increased to perform engagement control. Then the hydraulic pressure PB1 for the first frictional engagement element B1 for a coasting state is controlled to an engaging state. At that time, an input rotation speed $N_T$ is detected, the oil pressure for the second frictional engagement element B2 is controlled, and shift end, that is a synchronized rotation speed after the shift, is detected.

In the aforementioned shift control, in the case of a high load state, for example in the case of power on, the hydraulic pressure PB2 for the second frictional engagement element can be controlled properly with a feedback control based on the input rotation speed $N_T$ as shown in FIG. 10(a). But in the case of a low load state, for example in the case of power off, it is difficult to control a low torque properly because a rate of an increase of a torque capacity against an increase of the hydraulic pressure PB2 is large. That is because the hydraulic pressure PB2 has a large capacity in order to be able to activate a vehicle driving state. Therefore, the input rotation speed $N_T$ is decreased too much resulting in a large deviation from the synchronized rotation speed because the second frictional engagement element is connected via the one-way clutch. When the frictional engagement element for the coasting state is engaged and the input rotation speed $N_T$ becomes the synchronized rotation speed, a shift shock is caused.

SUMMARY OF THE INVENTION

In view of the above problems associated with the prior art, an object of the invention is to provide a shift control device for an automatic transmission that always performs a shift control properly and prevents shift shock irregardless of the load states.

In order to achieve the aforementioned object, according to an embodiment of the present invention a shift control device for an automatic transmission comprises a gear unit interposed between an engine output shaft and driven wheels of a vehicle for achieving plural gear stages, a plurality of frictional engagement elements comprising a first frictional engagement element directly connected to a predetermined rotational element of the gear unit and a second frictional engagement element connected to the predetermined rotational element via a one-way clutch in series for changing a power transmission path through the gear unit, a plurality of hydraulic servos for engaging and disengaging the plurality of frictional engagement elements, a first hydraulic pressure adjusting device for adjusting a hydraulic pressure applied to the hydraulic servo for the first frictional engagement element, a second hydraulic pressure adjusting device for adjusting a hydraulic pressure applied to the hydraulic servo for the second frictional engagement element, a hydraulic control device for outputting an adjusting signal to the first hydraulic pressure adjusting device and the second hydraulic pressure adjusting device, a vehicle load detecting device for detecting a load state of the vehicle, and an engaging sequence changing device for outputting a signal to the hydraulic control device for changing the sequence of engagement between the first frictional engagement element and the second frictional engagement element.

The hydraulic control device performs a piston stroke control, for putting the hydraulic servo for the first frictional engagement element and the hydraulic servo for second frictional engagement element into a state just before a torque is transmitted, by moving a piston of the hydraulic servo for the first frictional engagement element and the hydraulic servo for second frictional engagement element individually and synchronistically based on a start of a shift control to a predetermined gear stage.

When a value detected by the vehicle load detecting device is less than a predetermined value, the hydraulic control device performs an engagement control for the second frictional engagement element so that a torque capacity of the second frictional engagement element is increased, and after an input rotation speed becomes approximately equal to the synchronized rotation speed after the shift, the hydraulic control device starts an engagement control for the first frictional engagement element.

When a value detected by the vehicle load detecting device is less than a predetermined value, the hydraulic control device performs an engagement control for the first frictional engagement element so that a torque capacity of the first frictional engagement element is increased, and after an input rotation speed becomes approximately equal to the synchronized rotation speed after the shift, the hydraulic control device starts an engagement control for the second frictional engagement element.

The hydraulic control device controls a hydraulic pressure applied to the hydraulic servo for the first frictional engagement element or the hydraulic servo for second frictional engagement element based on an absolute value of an input torque.

According to the invention, the sequence of engagement between the second frictional engagement element connected in series with the one-way clutch and the first frictional engagement element is changed based on the load state of the vehicle. Therefore, the frictional engagement element having the desired torque capacity performs the engagement control properly in accordance with an associated hydraulic pressure adjusting device. Therefore, shift shock is prevented.

Figure 10B:
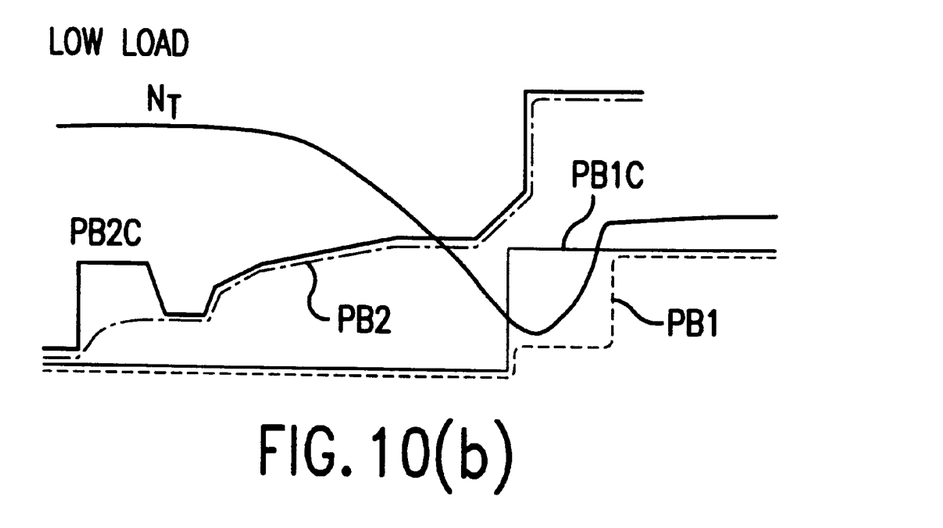

When the power is off or load is low and a power on shift is performed in the prior art, the input rotation speed $N_T$ become less than the desired synchronized rotation after the shift because of over-run of the one-way clutch, as shown in FIG. 10(b). But in an embodiment of the present invention, the frictional engagement element that is engaged later after engagement of a frictional engagement element to initiate the on-shift, achieves engagement control quickly because the first frictional engagement element and the second frictional engagement element are actuated by the hydraulic servo piston stroke control simultaneously and are brought to the state just before the frictional engagement elements have a torque capacity. Therefore, when the power is off or the load is low before a power on shift, for example, the input rotation speed is prevented from decreasing too much because of the over-run of the one-way clutch, and a free running feeling is prevented. Therefore, the shift feeling is improved.

The second frictional engagement element has a comparatively large torque capacity because the second frictional engagement element transmits an input torque from the engine to the wheels in a vehicle running state. When the vehicle is in a high load state, the transmission is shifted to a predetermined gear stage by the engagement control for the second frictional engagement element. Therefore, the shift control is performed properly in the high load state. In addition, problems with heat buildup by the second frictional engagement element and a resulting lowering of durability of the first and second frictional engagement elements is prevented.

The first frictional engagement element has a comparatively small torque capacity for enabling engine braking during a coasting state. When the vehicle is in a low load state, the transmission is shifted to a predetermined gear stage by the engagement control for the first frictional engagement element. Therefore, the low torque resulting from the low load is controlled properly and shift shock is prevented. Therefore, the shift control is performed properly in the low load state.

The control in a low load state having a negative torque state is performed with the same control logic as the case of a positive torque state because the control is performed based on an absolute value of the input torque. Therefore, a memory capacity of the hydraulic control device can be decreased.

BRIEF DESCRIPTION OF THE DRAWINGS

The invention will be described in conjunction with the following drawings in which like features are designated with like reference characters, and wherein.

DETAILED DESCRIPTION OF THE INVENTION

The invention will become more apparent from the following detailed description of preferred embodiments with reference to the accompanying drawings.

Figure 1:
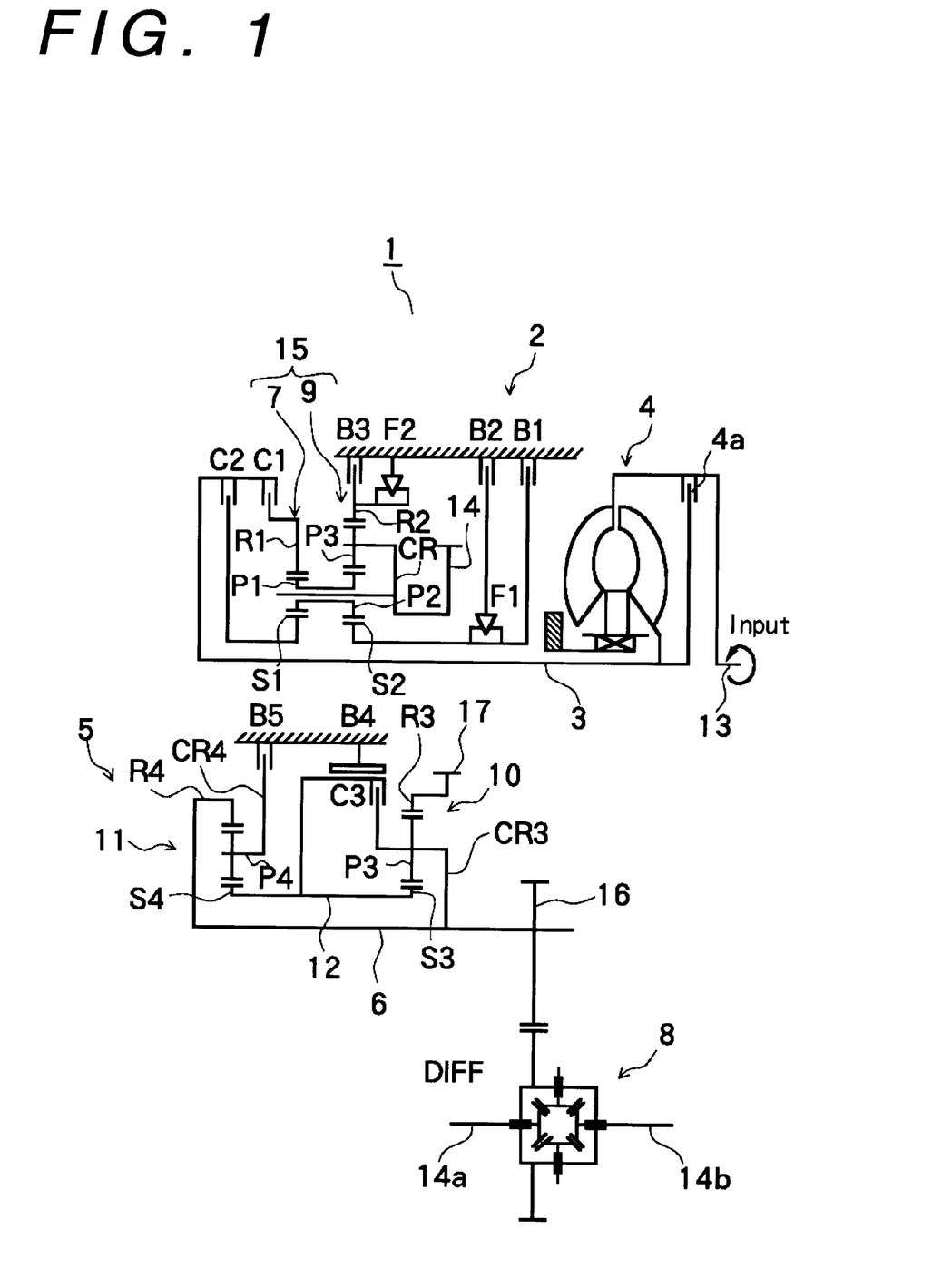
FIG. 1 is a schematic diagram illustrating an automatic transmission of the invention.

As shown in FIG. 1, a 5-speed automatic transmission 1 comprises a torque converter 4, a 3-speed main transmission mechanism 2, a 3-speed auxiliary transmission mechanism 5 and a differential unit 8. These components are connected to each other to form a single structure accommodated in a case. The torque converter 4, which is provided with a lock-up clutch 4a, receives torque from an engine crank shaft 13, supplying the torque to an input shaft 3 of the main transmission mechanism 2 through a hydraulic flow in the torque converter 4 or through the mechanical joint of the lock-up clutch 4a. The first shaft 3 (input shaft) aligned with the crank shaft, the second shaft 6 (counter shaft) arranged parallel to the first shaft 3, and the third shaft 14a, 14b (a left-right vehicle shaft) are rotatably supported in the case. A valve body is established on the outside of the case.

The main transmission mechanism 2 has a planetary gear unit 15 as a gear unit which comprises a simple planetary gear 7 and a double-pinion planetary gear 9. The simple planetary gear 7 comprises a sun gear S1, a ring gear R1 and a carrier CR for supporting a pinion P1. The pinion P1 is engaged with sun gear S1 and ring gear R1. The double-pinion planetary gear 9 comprises the sun gear S2, having a different number of gear teeth than sun gear S1, a ring gear R2 and the carrier CR shared with the simple planetary gear 7 for supporting the pinion P2 and a pinion P3 of the double-pinion planetary gear 9. The pinion P2 is engaged with the sun gear S2, and the pinion P3 is engaged with the ring gear R2.

The input shaft 3, which is associated with the crank shaft 13 through the torque converter 4, can be linked to the ring gear R1 of the simple planetary gear 7 through a first (forward) clutch C1 and to the sun gear S1 of the simple planetary gear 7 through a second (direct) clutch C2. The sun gear S2 of the double-pinion planetary gear 9 can be stopped from rotation directly by a first brake B1 as a first frictional engagement element and stopped by a second brake B2 as a second frictional engagement element through a first one-way clutch F1. The ring gear R2 of the double-pinion planetary gear 9 can be stopped from rotation by a third brake B3 and a second one-way clutch F2. The common carrier CR is linked to a counter drive gear 14, which serves as an output member of the main transmission mechanism 2.

The auxiliary transmission mechanism 5 comprises an output gear 16, a first simple planetary gear 10 as a gear unit and a second simple planetary gear 11 as a gear unit, which are arranged sequentially in the axial direction of the second shaft 6 serving as a counter shaft toward the rear side. The counter shaft 6 is rotatably supported by the case through a bearing. The first and second simple planetary gears 10 and 11 are both of the Sympson type.

As for the first simple planetary gear 10, a ring gear R3 is connected to a counter driven gear 17, which is engaged with the counter drive gear 14. A sun gear S3 is fixed to a sleeve shaft 12, which is rotatably supported by the counter shaft 6. A pinion P3 is supported by a carrier CR3, and a flange of carrier CR3 has an end thereof connected to the counter shaft 6 to form an assembly. The other end of the carrier CR3 is connected to an inner hub of a third (UD direct) clutch C3. As for the second simple planetary gear 11, a sun gear S4 is formed on the sleeve shaft 12 and connected to the sun gear S3 of the first simple planetary gear 10. A ring gear R4 is linked to the counter shaft 6.

The UD direct clutch C3 is provided between the carrier CR3 and the sleeve shaft 12 connecting the sun gear S3 to the sun gear S4. The sun gear S3 and the sun gear S4 can be stopped from rotation by a fourth brake B4 serving as a band brake. A carrier CR4 supporting a pinion P4 of the second simple planetary gear 11 can be stopped by a fifth brake B5.

Next, operation of the mechanisms of the 5-speed automatic transmission will be explained with reference to FIGS. 1 and 2.

At a first ratio of the automatic transmission 1 in the D (drive) range, the forward clutch C1 is engaged, and the fifth brake B5 and the second one-way clutch F2 are also engaged, operating so as to maintain the ring gear R2 of the double-pinion planetary gear 9 and the carrier CR4 of the second simple planetary gear 11 in the stopped state. In this state, the rotation of the input shaft 3 is transmitted to the ring gear R1 of the simple planetary gear 7 through the forward clutch C1. In addition, since the ring gear R2 of the double-pinion planetary gear 9 is stopped, the common carrier CR is rotated in the positive direction at a substantially reduced rotational speed, while the sun gear S1 and the sun gear S2 are in a rotating state in the reverse direction. That is to say, the main transmission mechanism 2 is in the state of a first gear ratio thereof and the rotation at the reduced rotational speed is transmitted to the ring gear R3 of the first simple planetary gear 10 in the auxiliary transmission mechanism 5 through the counter gears 14 and 17. With the carrier CR4 of the second simple planetary gear 11 stopped, the auxiliary transmission mechanism 5 is also in the state of a first gear ratio thereof. In this state, the rotation of the main transmission mechanism 2 at the reduced rotational speed is further slowed down by the auxiliary transmission mechanism 5 and outputted from an output gear 16.

At a second ratio of the automatic transmission 1, the second brake B2 (or the first brake B1 during a coasting state) is engaged in addition to the engagement of the forward clutch C1. Furthermore, the engagement is switched over from the second one-way clutch F2 to the first one-way clutch F1 and the fifth brake B5 is maintained in the engaging state. In this state, the sun gear S2 is stopped from rotation by the second brake B2 and the first one-way clutch F1. As a result, the rotation of the ring gear R1 of the simple planetary gear 7 transmitted from the input shaft 3 through the forward clutch C1 causes the carrier CR to rotate in the positive direction while keeping the ring gear R2 of the double-pinion planetary gear 9 in a free rotating state in the positive direction. In addition, the rotation at the reduced rotational speed is transmitted to the auxiliary transmission mechanism 5 through the counter gears 14 and 17. That is to say, the main transmission mechanism 2 is in the state of a second gear ratio thereof while the auxiliary transmission mechanism 5 is in the state of the first gear ratio thereof due to the engagement of the fifth brake B5. As a result of combining the state of the second gear ratio of the main transmission mechanism 2 and the state of the first gear ratio of the auxiliary transmission mechanism 5, the second ratio is obtained in the automatic transmission 1 as a whole. At that time, the first brake B1 may be engaged when the sequence of the engagement of the first brake B1 and the second brake B2 is changed based on a load state as described later.

At a third ratio of the automatic transmission 1, the forward clutch C1, the second brake B2, the first one-way clutch F1 and the first brake B1 are maintained in the engaged state. In addition, the engagement of the fifth brake B5 is released while, at the same time, the fourth brake (band brake) B4 is engaged. That is to say, the main transmission mechanism 2 is sustained in the second ratio state thereof and the rotation at the second gear ratio thereof is transmitted to the auxiliary transmission mechanism 5 through the counter gears 14 and 17. In addition, in the auxiliary transmission mechanism 5, the rotation from the ring gear R3 of the first simple planetary gear 10 is outputted from the carrier CR3 as a rotation at a second gear ratio thereof due to the fact that the sun gear S3 is stopped. As a result of combining the state of the second gear ratio of the main transmission mechanism 2 and the state of the second gear ratio of the auxiliary transmission mechanism 5, the third ratio is obtained in the automatic transmission 1 as a whole.

At a fourth ratio of the automatic transmission 1, the main transmission mechanism 2 is in the same state as the above states at the second and third ratios of the automatic transmission 1 wherein the forward clutch C1, the second brake B2, the first one-way clutch F1 and the first brake B1 are engaged. In the auxiliary transmission mechanism 5, on the other hand, the fourth brake (band brake) B4 is disengaged while the UD direct clutch C3 is engaged. In this state, the carrier CR3, the sun gear S3 of the first simple planetary gear 10 and the sun gear S4 of the second simple planetary gear 11 are connected, putting the first and second simple planetary gears 10 and 11 in a directly-coupled state wherein the first and second simple planetary gears 10 and 11 both rotate integrally. As a result of combining the state of the second gear ratio of the main transmission mechanism 2 and the state of a third gear ratio, that is, the directly-coupled state of the auxiliary transmission mechanism 5, a rotation of the fourth ratio in the automatic transmission 1 as a whole is outputted from the output gear 16.

At a fifth ratio of the automatic transmission 1, the forward clutch C1 and the direct clutch C2 are engaged and the rotation of the input shaft 3 is transmitted to the ring gear R1 and the sun gear S1 of the simple planetary gear 7. The main transmission mechanism 2 is thus in a directly-coupled state wherein the planetary gear unit 15 rotates integrally. In addition, the auxiliary transmission mechanism 5 is in a directly-coupled state with the third (UD direct) clutch C3 engaged. As a result of combining the state of a third gear ratio, that is, the directly-coupled state of the main transmission mechanism 2 and the state of the third gear ratio, that is, the directly-coupled state of the auxiliary transmission mechanism 5, a rotation at the fifth ratio in the automatic transmission 1 as a whole is outputted from the output gear 16.

Furthermore, the automatic transmission 1 also has intermediate ratios, that is, a third low ratio and a fourth low ratio which are operated during a down shift for acceleration for example.

At the third low ratio, the forward clutch C1 and the direct clutch C2 are engaged. Actually, the second brake B2 is also engaged but is over-run by the one-way clutch F1. The main transmission mechanism 2 is in a state of the third gear ratio thereof with the planetary gear unit 15 thereof directly coupled. On the other hand, the fifth brake is engaged, putting the auxiliary transmission mechanism 5 in a state of the first gear ratio thereof. As a result of combining the state of the third gear ratio of the main transmission mechanism 2 and the state of the first gear ratio of the auxiliary transmission mechanism 5, a ratio between the second and third ratios, that is, the third low ratio aforementioned is obtained in the automatic transmission 1 as a whole.

At the fourth low ratio, the forward clutch C1 and the direct clutch C2 are engaged, putting the main transmission mechanism 2 in a state of the third gear ratio thereof with the planetary gear unit 15 thereof put in a directly-connected-rotation state as is the case with the state of the third low ratio. On the other hand, the fourth brake (band brake) B4 is engaged and the sun gear S3 of the first simple planetary gear 10 is halted, putting the auxiliary transmission mechanism 5 in a state of the second gear ratio thereof. As a result of combining the state of third gear ratio of the main transmission mechanism 2 and the state of the second gear ratio of the auxiliary transmission mechanism 5, a ratio between the third and fourth ratios, that is, the fourth low ratio aforementioned is obtained in the automatic transmission 1 as a whole.

Figure 2:
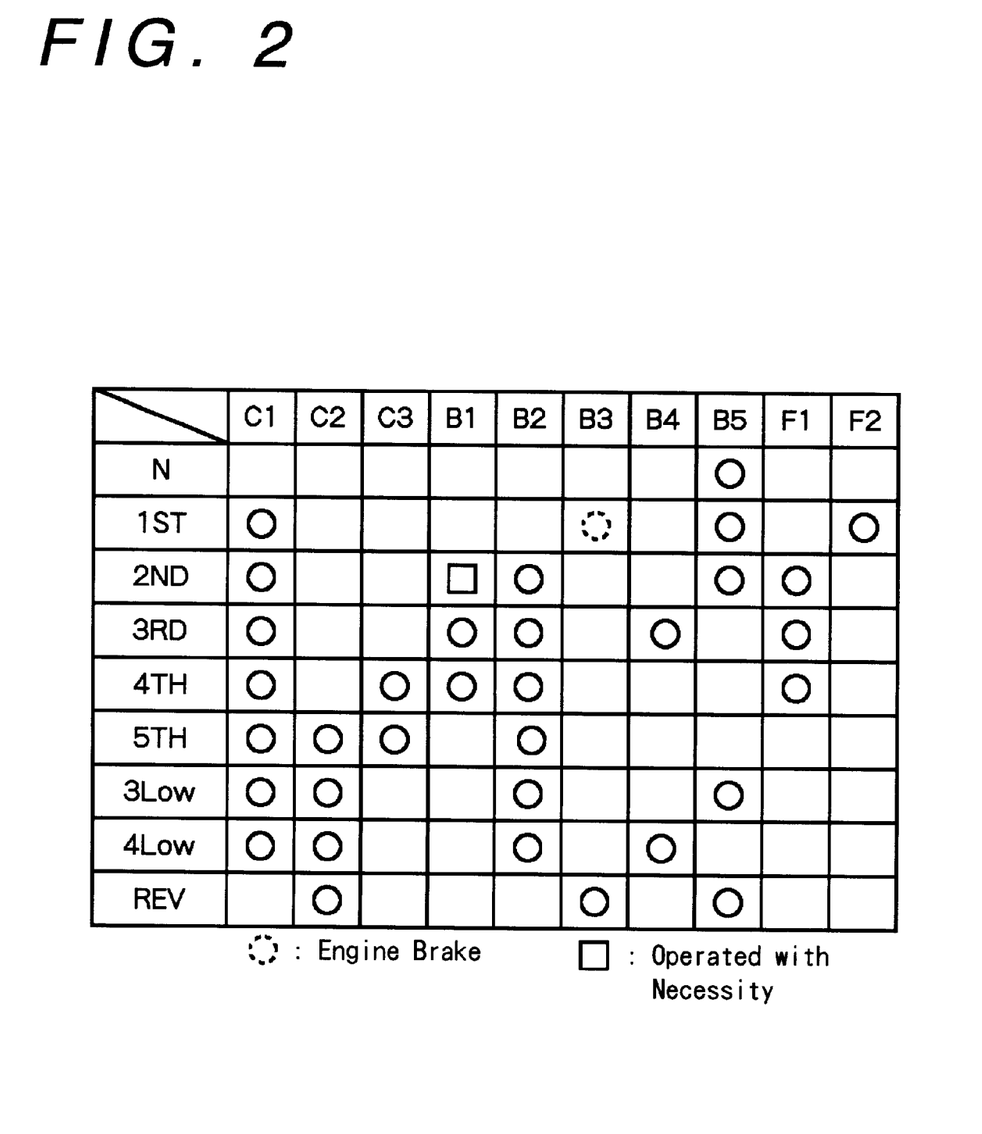
FIG. 2 is a table showing the operation of the automatic transmission as shown in FIG. 1.

It should be noted that each dotted-line circle shown in FIG. 2 indicates that a coasting engine brake is working in the 4, 3 or 2 range. That is to say, at the first ratio, the third brake B3 is engaged, halting the rotation of the ring gear R2 caused by an over-run of the second one-way clutch F2. In addition, at the second, the third, and the fourth gear ratios, the first brake B1 is engaged, halting the rotation of the sun gear S1 caused by an over-run of the first one-way clutch F1.

In the R (reverse) range, the direct clutch C2 and the third brake B3 are both engaged and, at the same time, the fifth brake B5 is also engaged as well. In this state, the rotation of an input shaft 3 is transmitted to the sun gear S1 of the simple planetary gear 7 through the direct clutch C2, and the ring gear R2 of the double-pinion planetary gear 9 is stopped by the third brake B3. As a result, while the ring gear R1 of the simple planetary gear 7 is put in a rotation state in the reverse direction, the carrier CR is also rotated in the reverse direction. This rotation in the reverse direction is transmitted to the auxiliary transmission mechanism 5 through the counter gears 14 and 17. The carrier CR4 of the second simple planetary gear 11 is stopped also in the reverse rotational direction by the fifth brake B5, maintaining the auxiliary transmission mechanism 5 in the state of the first gear ratio thereof. As a result of combining the rotation of the main transmission mechanism 2 in the reverse direction and the rotation of the auxiliary transmission mechanism 5 at the first gear ratio, a rotation at a reduced rotational speed in the reverse direction is outputted from the output gear 16.

Figure 3:
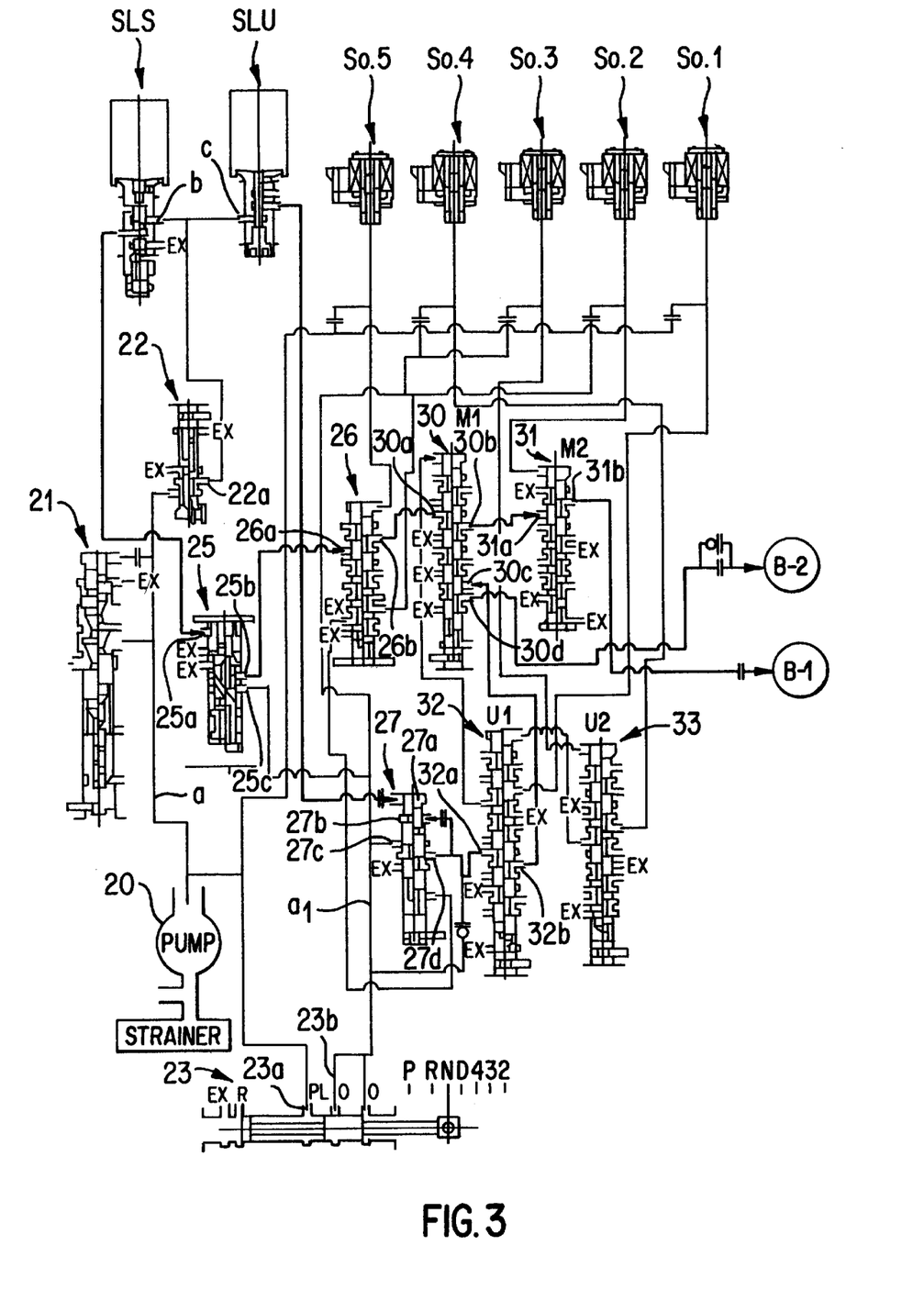
FIG. 3 is a diagram showing a part of the hydraulic control circuit of the automatic transmission shown in FIG. 1.

Next, a hydraulic control circuit of the 5-speed automatic transmission will be explained with reference to FIG. 3. The hydraulic control circuit in FIG. 3 is showing just components of the hydraulic control circuit that is necessary for explaining the operations of the embodiment. The actual circuit comprises many additional components and is a complicated circuit.

In FIG. 3, Notations So. 1, So. 2, So. 3, So. 4, and So. 5 denote solenoid valves for performing ON-OFF control. The solenoid valves So. 1 and So. 4 are normally open type solenoids, and the solenoid valves So. 2, So. 3 and So. 5 are normally-closed type solenoids. A notation SLS denotes a first linear solenoid valve as a first hydraulic pressure adjusting device, and a notation SLU denotes a second solenoid valve as a second hydraulic pressure adjusting device. The first linear solenoid valve SLS is exclusively used for adjusting a hydraulic pressure applied to hydraulic servos. The second linear solenoid valve SLU is used for performing a slip-control to the lock-up clutch mainly, and also used for adjusting the hydraulic pressure applied to the hydraulic servos.

A reference numeral 20 denotes an oil pump. A reference numeral 21 denotes a primary regulator valve. The primary regulator valve 21 regulates a hydraulic pressure, outputted from the hydraulic pump 20, to a line pressure based on a hydraulic pressure (a throttle pressure) outputted from a linear solenoid valve (not shown), and outputs the line pressure to a line-path a. A reference numeral 22 denotes a solenoid modulator valve. The solenoid modulator valve 22 reduces the line pressure, and outputs the reduced hydraulic pressure from an output port 22$a$ to an input port b of the first linear solenoid valve SLS and an input port c of the second linear solenoid valve SLU. A reference numeral 23 denotes a manual valve. The manual valve 23 connects a line pressure port 23$a$ to one of each output port thereof in accordance with an operational position of a shift lever. For example, when the shift lever is placed at a position D, 4, 3, or 2, the line pressure port 23$a$ is connected to an output port 23$b$.

A reference numeral 25 denotes a shift pressure control valve which is a modulator valve, a reference numeral 26 denotes a pressure relay valve which is a hydraulic pressure relay valve, and a reference numeral 27 denotes a B2 control valve, which is a modulator valve. A reference numeral 30 denotes a first (M1) shift valve for the main transmission mechanism 2, a reference numeral 31 denotes a second (M2) shift valve for the main transmission mechanism 2, a reference numeral 32 denotes a first (U1) shift valve for the auxiliary transmission mechanism 5, and a reference numeral 33 denotes a second (U2) shift valve for the auxiliary transmission mechanism 5. The shift pressure control valve 25 is operated by a control pressure applied from the first linear solenoid valve SLS to an oil chamber 25$a$, and properly modulates the line pressure applied from a line-path a, to a port 25$c$. The modulated pressure is outputted from an output port 25$b$. The B2 control valve 27 is operated by a control pressure applied from the second linear solenoid valve SLU to an oil chamber 27$a$ and a modulated pressure that is a feedback pressure applied from an output port 27$d$ to a port 27$b$. The B2 control valve 27 properly modulates the line pressure applied from the line-path $a_1$ to a port 27$c$, and also outputs the modulated pressure from the output port 27$d$.

A notation B-2 denotes a second hydraulic servo for the second brake B2, and a notation B-1 denotes a first hydraulic servo for the first brake B1. Hydraulic pressures are applied to these hydraulic servos or drained from these hydraulic servos by changing the positions of spools within shift valves 30, 31, 32, 33. The second brake B2 has a large torque capacity in order to be able to maintain a state in which a torque from an engine is transmitted to vehicle wheels. The first brake has a comparatively small torque capacity for enabling engine braking during a coasting state of the vehicle.

In a shift from the first gear ratio to the second gear ratio, hydraulic pressures are applied to the second hydraulic servo B-2 for the second brake B2 and the first hydraulic servo B-1 for the first brake B1. At that time, the modulated pressure from the shift pressure control valve 25, which is operated by the first linear solenoid valve SLS, is applied to the first hydraulic servo B-1, and the modulated pressure from the B2 control valve 27, which is operated by the second linear solenoid valve SLU, is applied to the second hydraulic servo B-2. That is to say, the modulated pressure from the output port 25b of the shift pressure control valve is applied to the first hydraulic servo B-1 for the first brake B1 through ports 26a and 26b of the pressure relay valve 26 in a position as shown on the right-half side, ports 30a and 30b of the M1 shift valve 30 in a position as shown on the left-half side, and ports 31a and 31b of the M2 shift valve 31 in a position as shown on the right-half side. The modulated pressure from the output port 27d of the B2 control valve 27 is applied to the second hydraulic servo B-2 for the second brake B2 through ports 32a and 32b of the U1 shift valve 32 in a position as shown on the left-half side and ports 30c and 30d of the M1 shift valve 30 in a position as shown on the left-half side.

Figure 4:
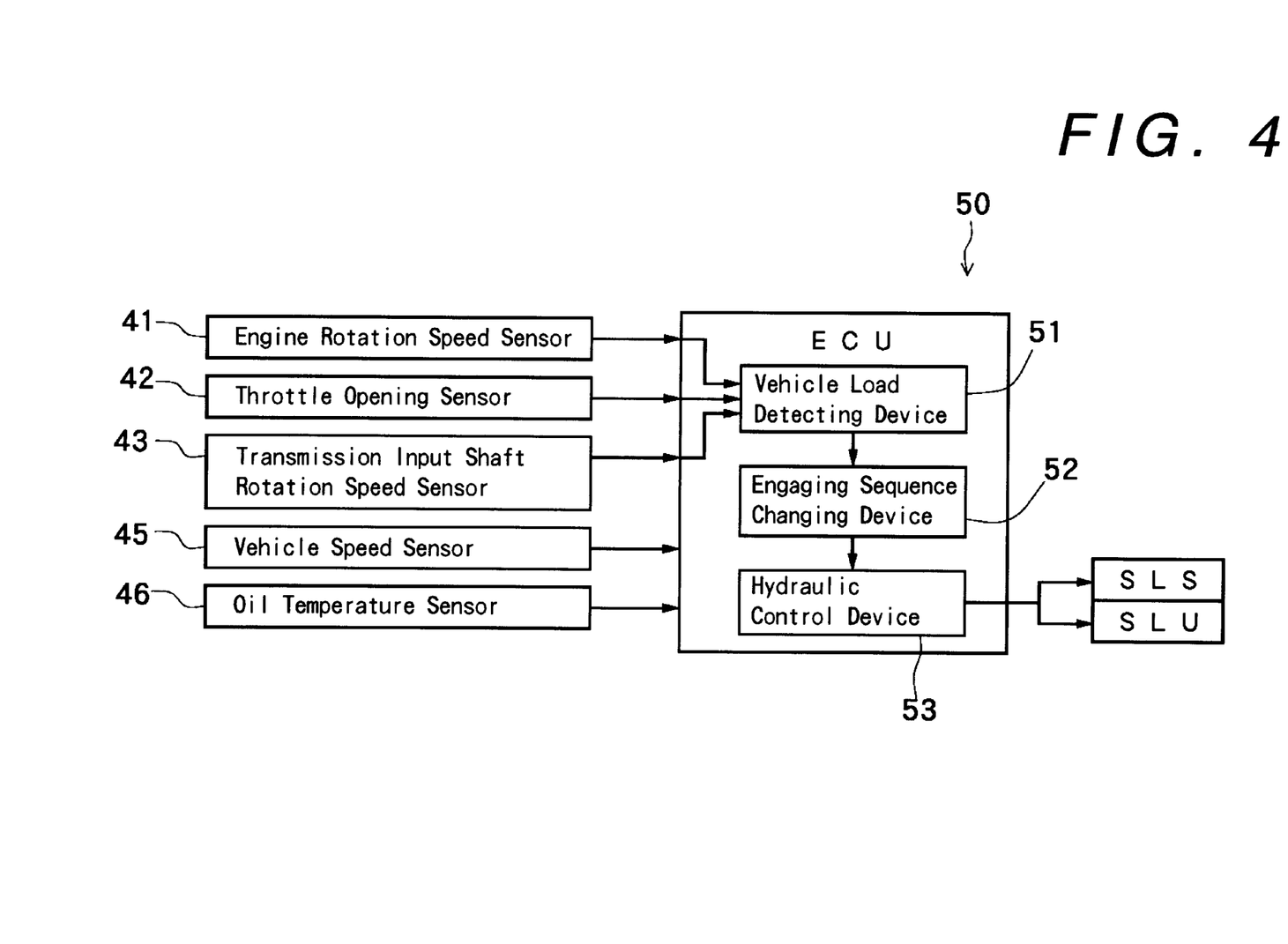
FIG. 4 is a block diagram showing an electrical control in accordance with the invention.

FIG. 4 is a block diagram showing a electric control. A reference numeral 50 denotes an electrical control unit (ECU) comprising a micro computer or processor. The electrical control unit is inputted signals from an engine rotation speed sensor 41, a throttle opening sensor 42, a transmission input shaft rotation speed sensor 43, a vehicle speed sensor 45, and an oil temperature sensor 46, and outputs signals to the first linear solenoid valve SLS and the second linear solenoid valve SLU in the hydraulic control circuit. The electrical control unit comprises a hydraulic control device 53 for controlling the first linear solenoid valve SLS and the second linear solenoid valve SLU, a vehicle load detecting device 51 detecting a load state of the vehicle, and an engaging sequence changing device 52 controlling the hydraulic control device 53 for changing a sequence of operation between the first linear solenoid valve SLS and the second linear solenoid valve SLU based on the vehicle load detected by the vehicle load detecting device 51. The vehicle load detecting device 51 detects the vehicle load, that is an input torque $T_T$ (turbine torque) of the 5-speed automatic transmission. At first, an engine torque is linearly interpolated from a map on the basis of the throttle opening detected by the throttle opening sensor 42 and the engine rotation speed detected by the engine rotation speed sensor 41. Next, speed ratio (Input RPM of transmission/ engine RPM) is computed from the input rotation speed of the torque converter 4 detected by the engine rotation speed sensor 41 and the output rotation speed of the torque converter 4 detected by the transmission input shaft rotation speed sensor 43, and a torque ratio corresponding to the speed ratio is determined from a map. Next, the input torque $T_T$ is determined by multiplying the engine torque by the torque ratio.

A shift control in an up-shift from the first ratio to second ratio will be explained with reference to FIG. 5 through FIG. 9. The up-shift from the first ratio to the second ratio is achieved by stopping rotation of the sun gear S1 by the second brake B2, the first one-way clutch F1 and the first brake B1 in the state of the first ratio in which the ring gear R2 of the double pinion planetary gear 9 is stopped by the second one-way clutch F2. At that time, the vehicle load, that is the input torque $T_T$ is detected. Then, the sequence of engagement between the second brake B2 and the first brake B1 is changed based on the input torque.

Figure 5:
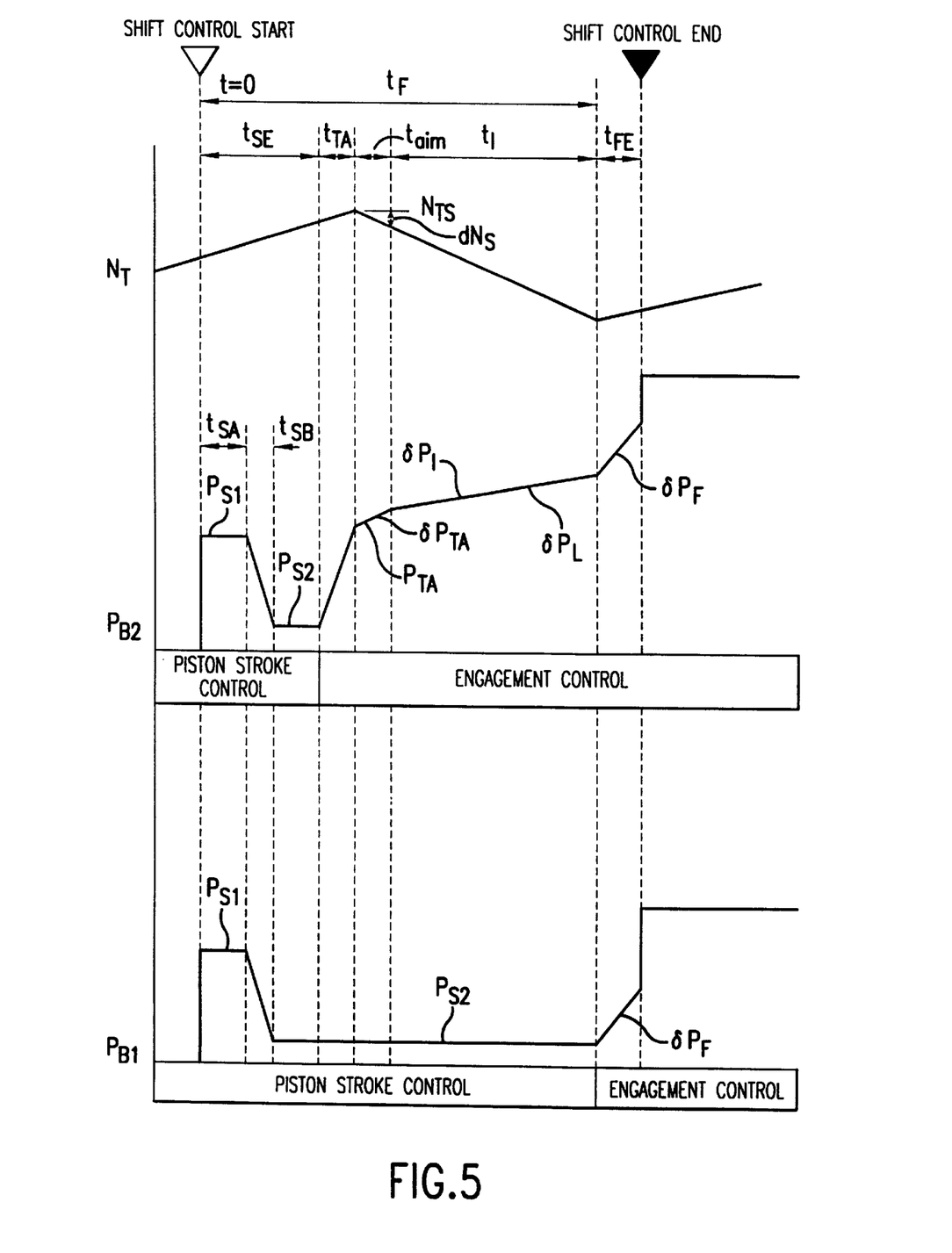
FIG. 5 is a timing chart when the vehicle is in a high load state.
Figure 6:
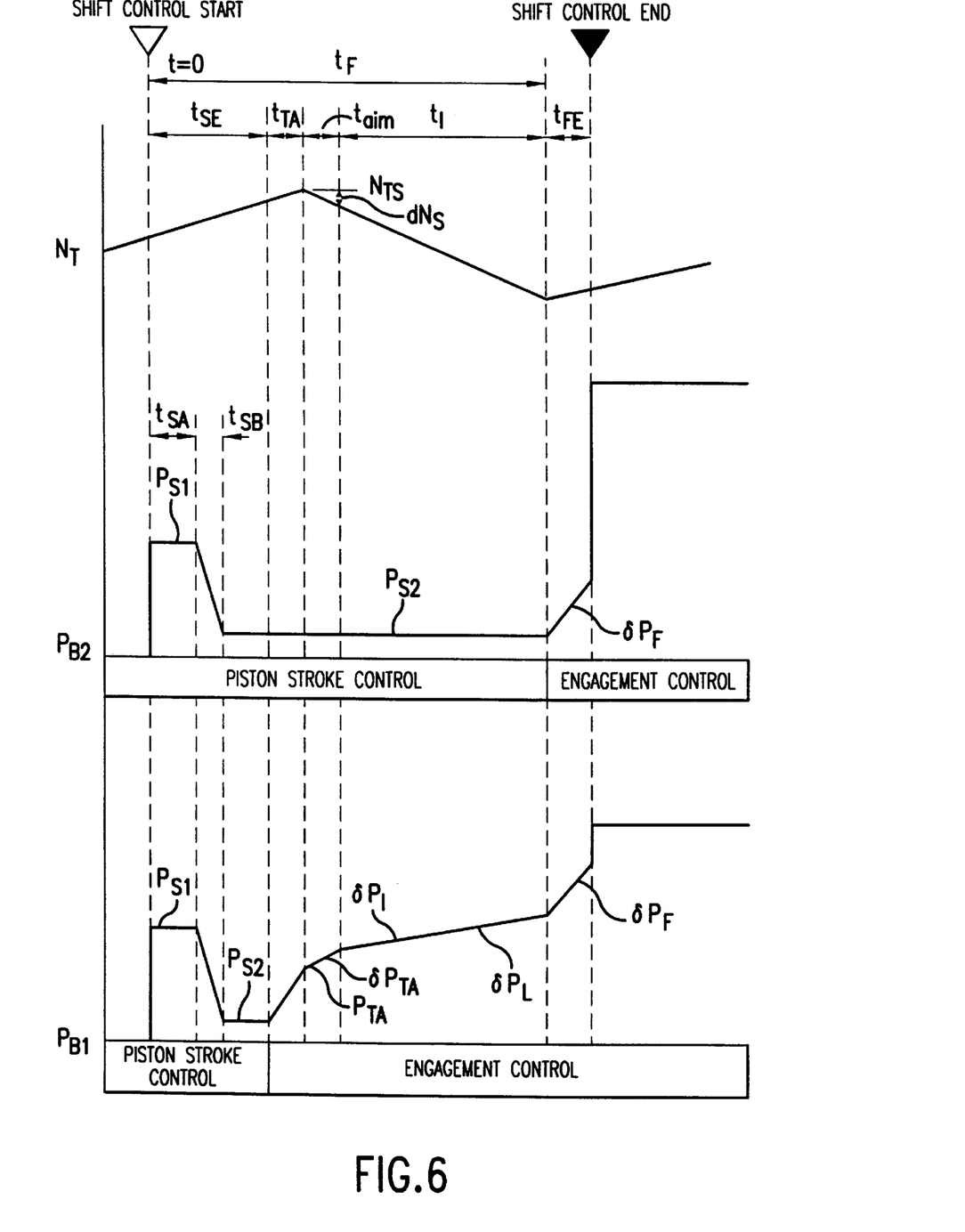
FIG. 6 is a timing chart when the vehicle is in a high load state.

When the up-shift from the first ratio to the second ratio is performed at a high load state, for example, when the vehicle is started and in an acceleration state with an operation of an accelerator pedal, as shown in FIG. 5, an engagement control for the second brake B2 is performed, and then an engagement control for the first brake B1 is performed. On the other hand, when the up-shift from the first ratio to the second ratio is performed at a low load state, for example, during a power off or when the throttle opening is low, as shown in FIG. 6, the engagement control for the first brake B1 is performed, and then the engagement control for the second brake B2 is performed.

Figure 7:
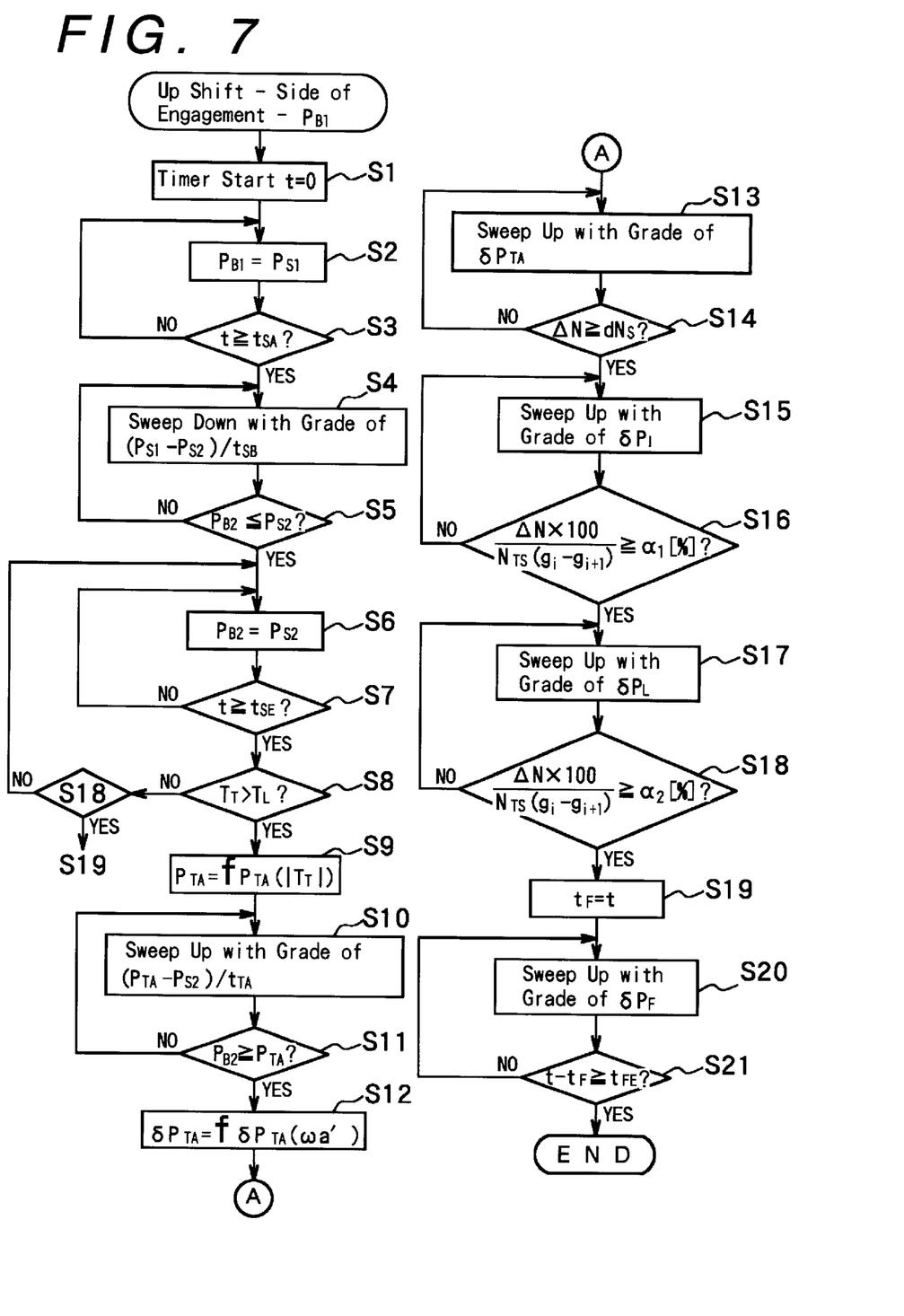
FIG. 7 is a flow chart showing primarily operation of the second frictional engagement element.
Figure 8:
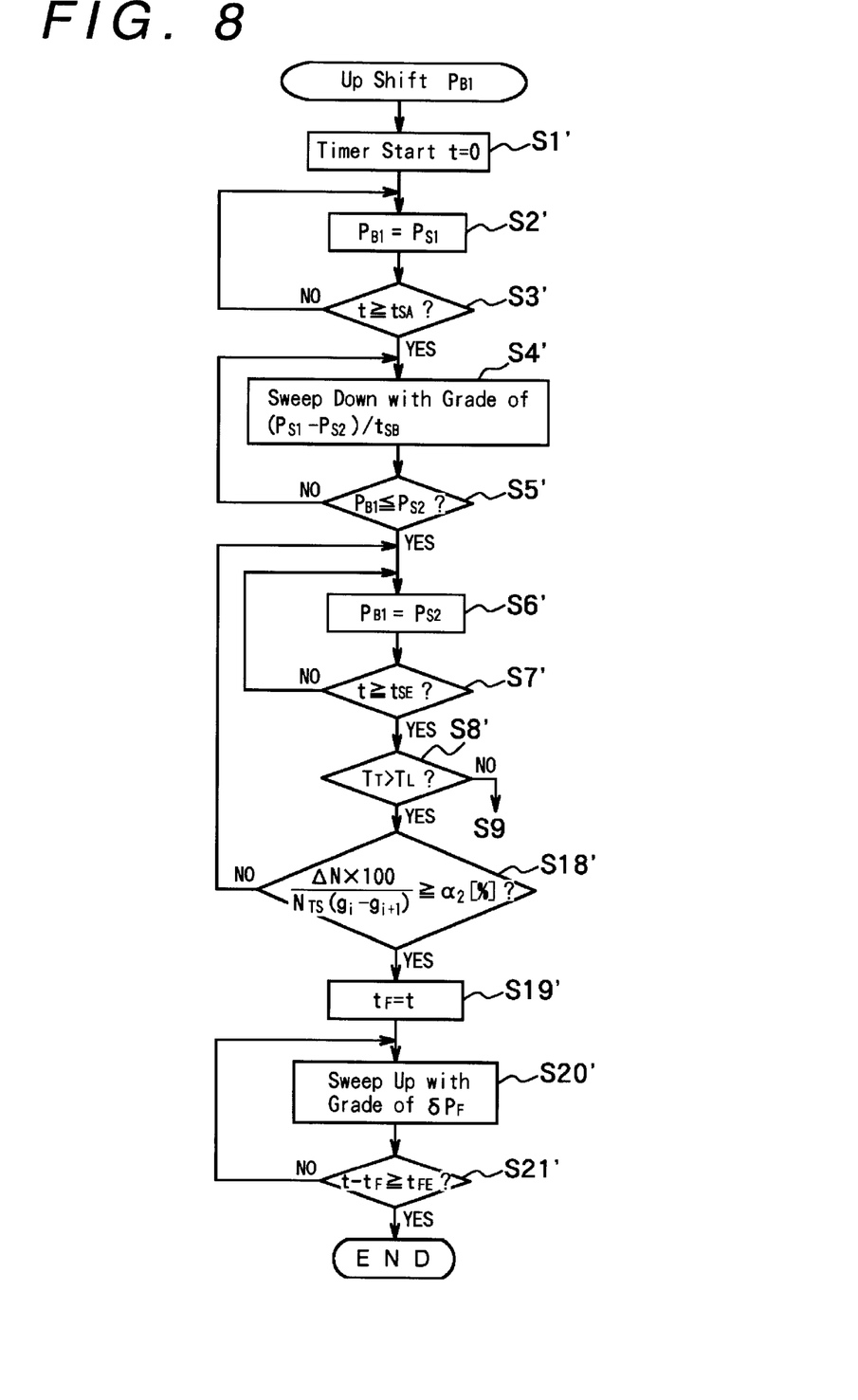
FIG. 8 is a flow chart showing primarily operation of the first frictional engagement element.

The shift control will be explained specifically with reference to timing charts in FIG. 5 and FIG. 6 and flow charts in FIG. 7 and FIG. 8. At a disengaging state, the one-way clutch is released automatically when the first or second brake is engaged.

The shift is determined by the signals from the throttle opening sensor 41 and the vehicle speed sensor 42, that are based on the operation of an accelerator pedal, and based on a shift map stored in the electric control unit 50. For example, the up-shift from the first ratio to the second ratio is determined. Then, a predetermined signal is outputted to the second linear solenoid SLU so that a hydraulic pressure $P_{B2}$ applied to the second hydraulic servo B-2 becomes a predetermined pressure (limit pressure) $P_{S1}$, (step S2). The predetermined pressure $P_{S1}$ is set at a necessary hydraulic pressure for filling up a hydraulic chamber of the second hydraulic servo B-2, and kept for a predetermined time $t_{SA}$. After the predetermined time $t_{SA}$ has elapsed (step S3), the hydraulic pressure $P_{B2}$ is decreased over time with a predetermined rate of decrease=$(P_{S1}-P_{S2})/t_{SB}$ (step S4). When the hydraulic pressure $P_{B2}$ is decreased to a predetermined low pressure $P_{S2}$ (step S5), the decrease in hydraulic pressure is interrupted and the hydraulic pressure $P_{B2}$ is kept at the predetermined low pressure $P_{S2}$ (step S6). The predetermined low pressure $P_{S2}$ is set to be more than a pressure required for a piston stroke within hydraulic servo B-2 and so that the rotation of the input shaft 3 is not changed. The hydraulic pressure $P_{B2}$ is kept at the predetermined low pressure $P_{S2}$ until a predetermined time $t_{SE}$ has elapsed (step S7).

The same operation is performed to the first hydraulic servo B-1 for the first brake B1. A predetermined signal is outputted to the first linear solenoid valve SLS, and a hydraulic pressure $P_{B1}$ applied to the first hydraulic servo B-1 is kept at the predetermined pressure (limit pressure) $P_{S1}$, for the predetermined time $t_{SA}$ (steps S1', S2' and S3'). After that, the hydraulic pressure is decreased over time to the predetermined low pressure $P_{S2}$ (steps S4' and S5'), and kept at the predetermined low pressure $P_{S2}$ (steps S6' and S7').

In the aforementioned state wherein the hydraulic pressure $P_{B2}$ for the second brake B2 and the hydraulic pressure $P_{B1}$ for the first brake B1 are kept at the predetermined low pressure $P_{S2}$, the vehicle load (input torque) $T_T$ is detected by the vehicle load detecting device 51, and the detected value is compared with a predetermined value $T_L$ (steps S8 and S8'). In a high load state ($T_T>T_L$), as shown in FIG. 5, a hydraulic servo piston stroke control is performed for bringing the frictional engagement of a frictional engagement element to the state just before a torque is transmitted by the hydraulic pressure $P_{B2}$ causing the second brake B2 to be engaged.

An engagement target pressure $P_{TA}$, which is a hydraulic pressure applied to a frictional engagement element just before an input rotation speed $N_T$ is changed (0ust before beginning an inertia phase), is calculated based on a predetermined function $P_{TA}=f_{PTA}(|T_T|)$, which is changed corresponding to an absolute value of the input torque $|T_T|$ (step S9). The engagement target pressure $P_{TA}$ is calculated as follows: At first, an engagement side torque allotment torque $T_A$ (=(1/a)*$T_T$, where 1/a=a torque allotment rate), is calculated. Then, the engagement target pressure $P_{TA}$ is calculated. $P_{TA}=(T_A/A_A)+B_A+\delta P_{TA}$, where $B_A$ is a piston stroke pressure (=a spring load), $A_A$=a frictional pad effective radius * a piston area * number of frictional pads * coefficient of friction, and $\delta P_{TA}$=an increase in hydraulic pressure over a time delay before a command signal. A predetermined rate of increase of hydraulic pressure is calculated with a formula $(P_{TA}-P_{S2})/t_{TA}$, based on the engagement target pressure $P_{TA}$ and a predetermined time $t_{TA}$. The hydraulic pressure $P_{B2}$ for the second brake B2 is increased over time at the predetermined rate of increase (step S10). In accordance with the first increase in hydraulic pressure over time having a comparatively rapid rate of increase, the engagement torque is increased and the hydraulic pressure $P_{B2}$ for the second brake B2 is increased to the engagement target pressure $P_{TA}$ (step S11).

When the hydraulic pressure $P_{B2}$ for the second brake B2 becomes the engagement target pressure $P_{TA}$, that is when the inertia phase has begun wherein the input rotation speed $N_T$ has begun to change, the increase in hydraulic pressure over the time delay before a command signal $\delta P_{TA}$ is calculated based on a predetermined function ($\delta P_{TA}=f\delta P_{TA}$ ($\omega a$')) corresponding to a target rotation change rate (d$\omega a$/dt; indicated as $\omega a$') that is set as a target when the input rotation speed $N_T$ begins to change (step S12). That is to say, when k (a characteristic of the hydraulic servo) is made to be a constant, $t_{aim}$ is made to be a target shift start time, $\omega a$' is made to be a target rotation change rate (a rate of change over time of the target rotation speed), and I is made to be an inertia amount, the change of the hydraulic pressure $\delta P_{TA}$ is calculated based on an equation ($\delta P_{TA}=(I*\omega a')/(k*t_{aim})$). Then the hydraulic pressure $P_{B2}$ for the second brake B2 is increased over time with the rate of increase of $\delta P_{TA}$ (step S13). This is a second increase in hydraulic pressure over time. The second increase is continued until a rotation change amount $\Delta N$ is indicative of a predetermined shift start $dN_s$ (step S14). The rotation change amount $\Delta N$ is a rotation change amount from an input rotation speed $N_{TS}$ when the rotation speed has started changing.

The target shift start time $t_{aim}$ is set as a function corresponding to the input rotation speed $N_T$. The change in rotation speed indicative of a predetermined shift start $dN_s$ is preferably a minimized change in rotation that can be actually detected, so the change in rotation speed for detecting a predetermined shift start $dN_s$ depends on the detecting accuracy of the input rotation speed sensor 43. With a low rotation speed, the detecting accuracy is not good, so a change in rotation speed for detecting the shift start must be large. Therefore, the target shift start time $t_{aim}$ becomes longer because the change in rotation speed for detecting a predetermined shift start $dN_s$ becomes large.

A hydraulic pressure change $\delta P_I$ is set by a feedback control based on the rotation change amount $\Delta N$, which is based on the detected values of the input rotation speed sensor 43. Then the hydraulic pressure $P_{B2}$ for the second brake B2 is increased over time with the rate of increase of $\delta P_I$ (step S15). The increase in hydraulic pressure with the rate of increase (or slope) of $\delta P_I$ is continued until $\alpha_1$ (%), for example 70%, of the rotation change amount $\Delta N$ from the shift start to the shift end has been completed (step S16). That is to say, when $N_{TS}$ is made to be the input rotation speed at the shift start, $\Delta N$ is made to be the rotation change amount, $g_i$ is made to be the gear ratio before the shift, and $g_{i+1}$ is made to be the gear ratio after the shift, the increase in hydraulic pressure with the slope of $\delta P_I$ is continued until $(\Delta N*100)/N_{TS}(g_i-g_{i+1})$ becomes $\alpha_1$ (%).

After $\alpha_1$ (%) of the rotation change amount $\Delta N$ from the shift start to the shift end has been completed, a hydraulic pressure change $\delta P_L$ that is different from $\delta P_I$ is set by a feedback control based on the rotation change amount $\Delta N$. This rotation change amount $\Delta N$ is comparatively small. Then the hydraulic pressure $P_{B2}$ for the second brake B2 is increased over time with the rate of increase of $\delta P_L$ (step S17). Generally, $\delta P_L$ has a more gradual slope or rate of change compared to $\delta P_I$. The increase of hydraulic pressure with the rate of change $\delta P_L$ is continued until $\alpha_2$ (%), for example 90%, of the rotation change amount $\Delta N$ from the shift start to the shift end has been completed (step S18). A target shift time $t_I$ for the increase of hydraulic pressure with the rate of income of $\delta P_I$ and $\delta P_L$ is set based on a throttle-opening/vehicle speed map which is chosen corresponding to an oil temperature.

After the target shift time $t_I$ has elapsed, a race time $t_F$ is set (step S19). This state is almost corresponded to the state wherein the inertia phase is ended (synchronized rotation state). Further, a hydraulic pressure change $\delta P_F$ with a comparatively large rate of change is set, and the hydraulic pressure $P_{B2}$ for the second brake B2 is increased rapidly over time with the rate of increase $\delta P_F$ (step S20). After a predetermined time $t_{FE}$, which is set as enough time for increasing to the engagement pressure, has elapsed from the race time $t_F$ (step S21), the hydraulic control for the second brake B2 is ended.

On the other hand, when the vehicle is in a high load state ($T_T>T_L$), the next step will be step S18'. At the step S18', the hydraulic pressure $P_{B1}$ for the first brake B1 is held with the predetermined low pressure $P_{S2}$ and held in the piston stroke control state until the rotation change amount becomes approximately $\alpha_2$ (%) of the rotation change amount $\Delta N$ from the shift start to the shift end, that is, until the shift to the second ratio is almost ended and the synchronized rotation is achieved. After the input rotation speed $N_T$ becomes almost synchronized with the input rotation speed after the shift, the race time $t_F$ is set (step S19'). The hydraulic pressure $P_{B1}$ for the first brake B1 is increased over time with the rate of increase of $\delta P_F$, which is a comparatively rapid rate of increase, for the predetermined time $t_{FE}$ (steps S20' and S21'). Then the hydraulic control for the first brake B1 is ended with the hydraulic control for the second brake B2.

At the steps S8 and S8', when the vehicle load detecting device 51 detects a low load state ($T_T<T_L$), as shown in FIG. 6, the hydraulic pressure $P_{B2}$ for the second brake B2 is held with the predetermined low pressure $P_{S2}$ and held in the piston stroke control state (step S18).

When the vehicle is in the low load state ($T_T<T_L$) at the step S8', the next step will be step S9. The hydraulic pressure $P_{B1}$ for the first brake B1 enables engagement control with a small torque capacity corresponding to the low load. That is to say, the engagement target pressure $P_{TA}$ is calculated based on the absolute value of the input torque $|T_T|$ (step S9), and then the first increase of hydraulic pressure over time to the engagement target pressure $P_{TA}$ is preformed (steps S10 and S11).

Figure 9:
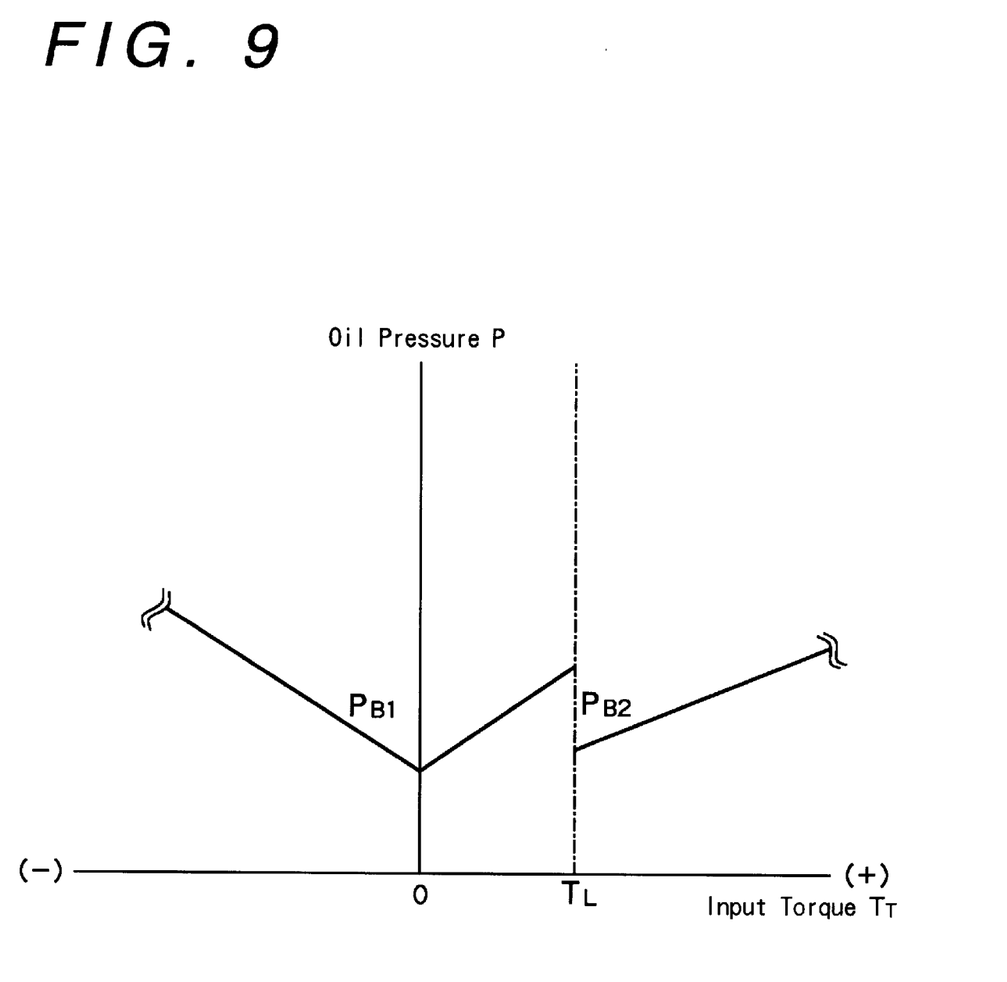
FIG. 9 is a diagram showing the relationship between the hydraulic pressure for a first brake and the hydraulic pressure for a second brake relative to an input torque.

In this situation, as shown in FIG. 9, when the vehicle is in the high load state in which the input torque $T_T$ is larger than the predetermined value $T_L$, the hydraulic pressure $P_{B2}$ for the second brake B2 increases in proportion to the increase in the positive direction of the input torque $T_T$.

When the vehicle is in the low load state in which the input torque $T_T$ is smaller than the predetermined value $T_L$, the hydraulic pressure $P_{B1}$ for the second brake B1 is controlled corresponding to states of the input torque $T_T$. The states include a state in which the input torque $T_T$ is a positive value and a state in which the input torque $T_T$ is a negative value. The low load state includes two states. One of the states is a state in which the input torque $T_T$ is smaller than the predetermined value $T_L$ and a positive value. This state represents a low load state in which, for example, the vehicle is driven on a flat road with a low throttle opening. The other state is a state in which the input torque $T_T$ is smaller than the predetermined value $T_L$ and a negative value. This state represents a coasting state in which the torque is transmitted from the vehicle wheels to the engine, for example, on a down slope road. Because the engagement target pressure $P_{TA}$ is calculated based on the absolute value of the input torque $|T_T|$, even when the vehicle is in the negative torque state, the same control which is performed in the positive torque state is performed. Therefore, a separate control logic is not needed for the positive torque state and the negative torque state individually, and a memory capacity is reduced.

The first hydraulic pressure $P_{B1}$ for the first brake B1 is increased over time with a rate of increase of the hydraulic pressure $\delta P_{TA}$ based on the target rotation change rate ωa' (step S13). When the rotation change amount ΔN reaches a rotation speed indicative of a predetermined shift start $dN_S$ (step S14), the first hydraulic pressure $P_{B1}$ for the first brake B1 is increased over time based on the feedback control (steps S15, S16 and S17). After the input rotation speed $N_T$ is approximately equal to the rotation after the shift (synchronized rotation state) (steps S18 and S19), the first hydraulic pressure $P_{B1}$ for the first brake B1 is rapidly increased over time (step S20), and the shift control is ended.

The second hydraulic pressure $P_{B2}$ for the second brake B2 is held in the piston stroke control state until the synchronized rotation at the step S18, and then rapidly increased over time. Then the shift control is ended (steps S19, S20 and S21).

The above-described embodiment discloses the shift from the first ratio to the second ratio. This control can be applied to other shifts in which a frictional engagement element connected to a one-way clutch and a frictional engagement element not connected to a one-way clutch are operated under differing load conditions.

We claim:

1. A shift control device for an automatic transmission for use in a vehicle having an engine and driven wheels, said device comprising:
   a gear unit for transmitting power between an engine output shaft and the driven wheels of a vehicle and for achieving plural gear stages;
   a plurality of frictional engagement elements including a first frictional engagement element, said first frictional engagement element being directly connected to a rotational element of the gear unit, and a second frictional engagement element being connected to the rotational element via a one way clutch in series for changing a power transmission path through the gear unit;
   a plurality of hydraulic servos for engaging and disengaging the plurality of frictional engagement elements;
   a first hydraulic pressure adjusting device for adjusting a hydraulic pressure applied to a first hydraulic servo of said plurality of hydraulic servos for engaging and disengaging the first frictional engagement element;
   a second hydraulic pressure adjusting device for adjusting a hydraulic pressure applied to a second hydraulic servo of said plurality of hydraulic servos for engaging and disengaging the second frictional engagement element;
   a hydraulic control device for outputting an adjusting signal to the first hydraulic pressure adjusting device and the second hydraulic pressure adjusting device;
   a vehicle load detecting device for detecting a load state of the vehicle; and
   an engaging sequence changing device for outputting a signal to the hydraulic control device for changing a sequence of engagement of the first frictional engagement element and the second frictional engagement element.

2. The shift control device according to claim 1, wherein the hydraulic control device performs an engagement control for the first frictional engagement element through said first hydraulic pressure adjusting device and said hydraulic servo so that a torque capacity of the first frictional engagement element is increased to allow a shift in gear stage, and after an input rotation speed of the gear unit becomes approximately synchronized with an output rotation speed after the shift, the hydraulic control device starts an engagement control for the second frictional engagement element through said second hydraulic pressure adjusting device and said second hydraulic servo, when a load state detected by the vehicle load detecting device is less than a predetermined value.

3. The shift control device according to claim 1, wherein the hydraulic control device controls a hydraulic pressure applied to the first hydraulic servo for the first frictional engagement element and the second hydraulic servo for the second frictional engagement element based on an absolute value of an input torque to said gear unit.

4. The shift control device according to claim 1, wherein the hydraulic control device performs a hydraulic servo piston stroke control, for actuating each of the first hydraulic servo for the first frictional engagement element and the second hydraulic servo for second frictional engagement element to a state at which said first and second frictional engagement elements are engaged by an amount just less than a torque transmitting amount, by moving a piston of the first hydraulic servo for the first frictional engagement element and a piston of the second hydraulic servo for second frictional engagement element individually and synchronistically based on a start of a shift control to a predetermined gear stage.

5. The shift control device according to claim 4, wherein the hydraulic control device performs an engagement control for the second frictional engagement element through said second hydraulic pressure adjusting device and said second hydraulic servo so that a torque capacity of the second frictional engagement element is increased to allow a shift in gear stage, and after an input rotation speed of the gear unit becomes approximately synchronized with an output rotation speed after the shift, the hydraulic control device starts an engagement control for the first frictional engagement element through said first hydraulic pressure adjusting device and said first hydraulic servo, when a load state detected by the vehicle load detecting device is more than a predetermined value.

6. The shift control device according to claim 5, wherein the hydraulic control device controls a hydraulic pressure applied to the first hydraulic servo for the first frictional engagement element and the second hydraulic servo for the second frictional engagement element based on an absolute value of an input torque to the gear unit.

7. The shift control device for the automatic transmission according to claim 4, wherein the hydraulic control device performs an engagement control for the first frictional engagement element through said first hydraulic pressure adjusting device and said first hydraulic servo so that a torque capacity of the first frictional engagement element is increased to allow a shift in gear stage, and after an input rotation speed of the gear unit becomes approximately synchronized with an output rotation speed after the shift, the hydraulic control device starts an engagement control for the second frictional engagement element through said second hydraulic pressure adjusting device and said second hydraulic servo, when a load state detected by the vehicle load detecting device is less than a predetermined value.

8. The shift control device according to claim 4, wherein the hydraulic control device controls a hydraulic pressure applied to the first hydraulic servo for the first frictional engagement element and the second hydraulic servo for the second frictional engagement element based on an absolute value of an input torque to said gear unit to said gear unit.

9. The shift control device according to claim 1, wherein the hydraulic control device performs an engagement control for the second frictional engagement element through said second hydraulic pressure adjusting device and said second hydraulic servo so that a torque capacity of the second frictional engagement element is increased to allow a shift in gear stage, and after an input rotation speed of the gear unit becomes approximately synchronized with an output rotation speed after the shift, the hydraulic control device starts an engagement control for the first frictional engagement element through said first hydraulic pressure adjusting device and said first hydraulic servo, when a load state detected by the vehicle load detecting device is more than a predetermined value.

10. The shift control device according to claim 9, wherein the hydraulic control device controls a hydraulic pressure applied to the first hydraulic servo for the first frictional engagement element and the second hydraulic servo for the second frictional engagement element based on an absolute value of an input torque to the gear unit.

* * * * *